United States Patent [19]

Hensing et al.

[11] Patent Number: 5,191,562
[45] Date of Patent: Mar. 2, 1993

[54] POSITIONING SYSTEM FOR THE HEADS OF A MAGNETO-OPTICAL DATA RECORDER

[75] Inventors: Johannes M. M. Hensing; Cornelius A. Hezemans, both of Eindhoven, Netherlands

[73] Assignee: U.S. Philips Corporation, New York, N.Y.

[21] Appl. No.: 585,342

[22] Filed: Sep. 19, 1990

[30] Foreign Application Priority Data

Jul. 6, 1990 [NL] Netherlands ............ 9001546

[51] Int. Cl.⁵ .............................. G11B 17/32
[52] U.S. Cl. ............................ 369/13; 369/215
[58] Field of Search .......... 369/215, 219, 220, 226, 369/228, 13

[56] References Cited

U.S. PATENT DOCUMENTS

| 4,327,434 | 4/1982 | Christopher | 369/220 |
|---|---|---|---|
| 4,712,203 | 12/1987 | Saito | 360/59 |
| 4,789,972 | 12/1988 | Oldham | 369/13 |
| 4,803,674 | 2/1989 | Nakao et al. | 369/13 |
| 4,843,600 | 6/1989 | Miyajima | 369/13 |
| 4,870,635 | 9/1989 | Block | 369/215 |
| 4,956,832 | 9/1990 | Miyasaka | 369/116 |
| 4,974,222 | 11/1990 | Ishitoya | 369/215 |
| 5,093,816 | 3/1992 | Taniguchi et al. | 369/13 |

FOREIGN PATENT DOCUMENTS

| 63-177304 | 7/1988 | Japan | 369/13 |
|---|---|---|---|
| 0251360 | 10/1989 | Japan | 369/13 |
| 1-287849 | 11/1989 | Japan | 369/13 |

Primary Examiner—Eugene R. LaRoche
Assistant Examiner—Tan Nguyen
Attorney, Agent, or Firm—David R. Treacy

[57] ABSTRACT

A device for inscribing and or reading a magneto-optical disc includes a turntable mounted for rotation about an axis of rotation, and an optical unit and a magnetic unit movably mounted opposite to and spaced from each other in a direction parallel to the axis of rotation. The optical unit and magnetic unit are mounted each to be movable in a plane transverse to the rotation axis. The magnetic unit includes a coil on a support which in turn is movably mounted on a displacement body which is radially moveable with respect to the axis. During operation a measurement and control system determines the radial position of the optical unit and the magnetic unit relative to each other in the radial direction, for controlling at least the radial position of the coil of the magnetic unit relative to an objective of the optical units.

19 Claims, 4 Drawing Sheets

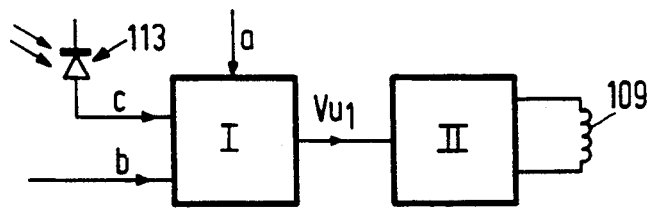
FIG.3
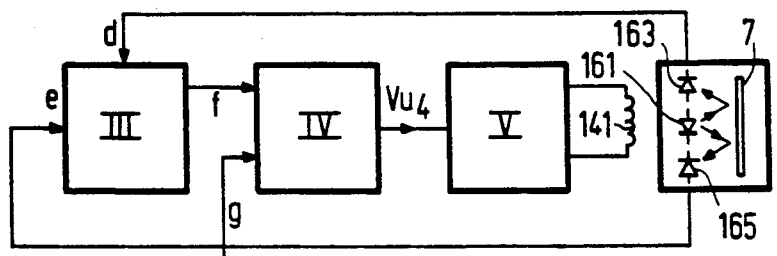
FIG.4
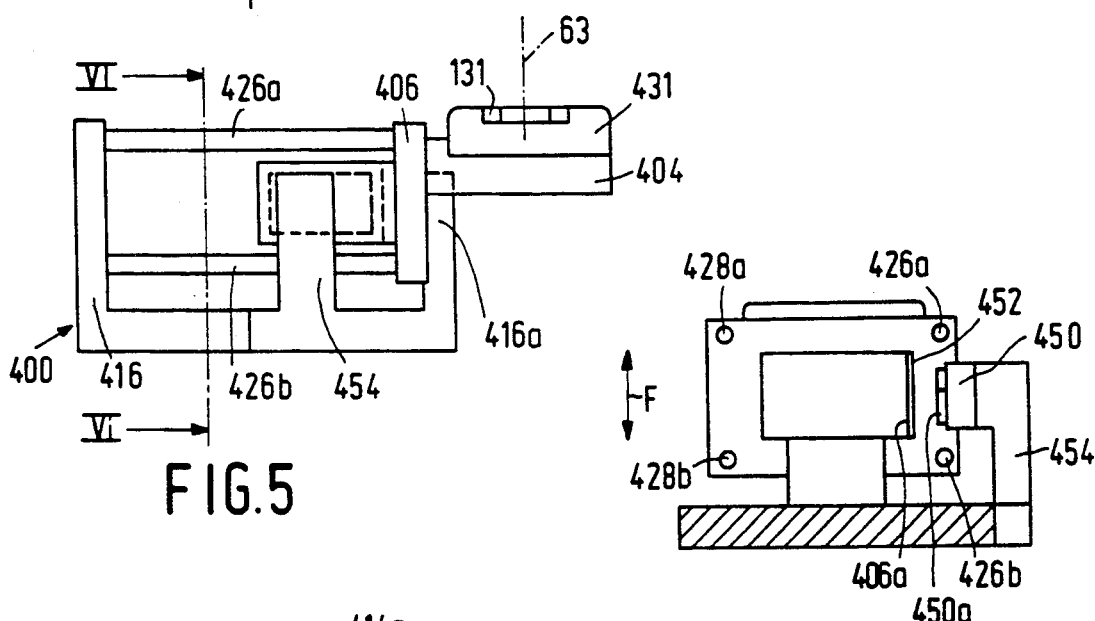
FIG.5
FIG.6
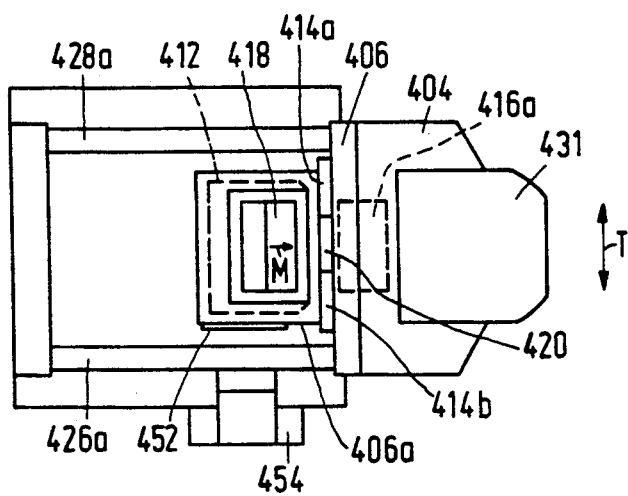
FIG.7

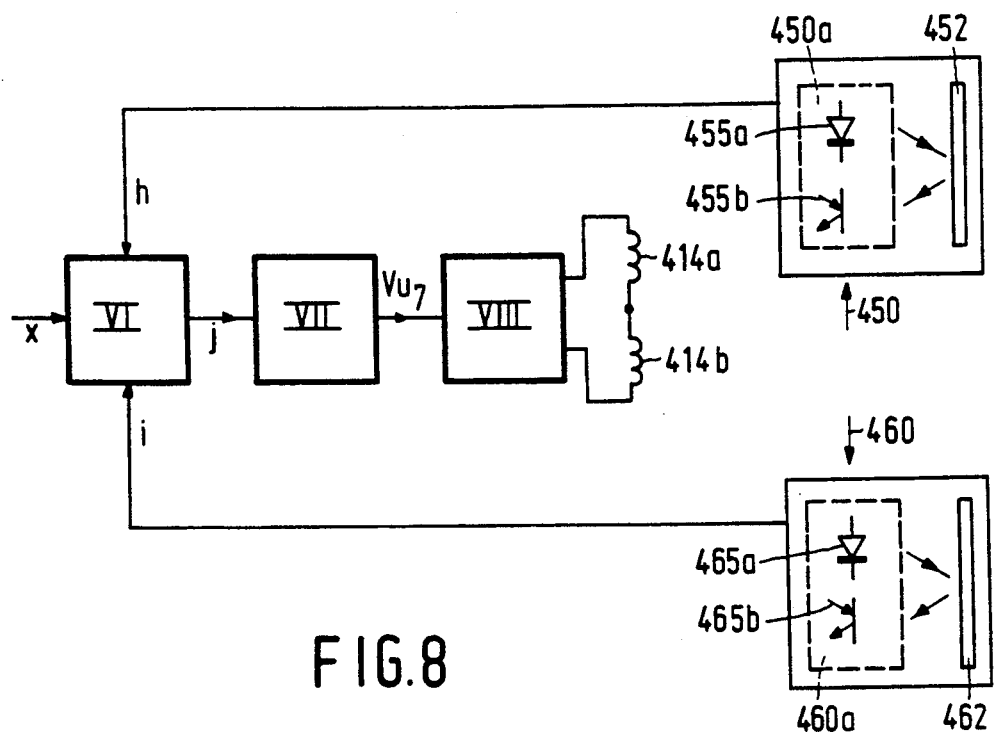
FIG.8
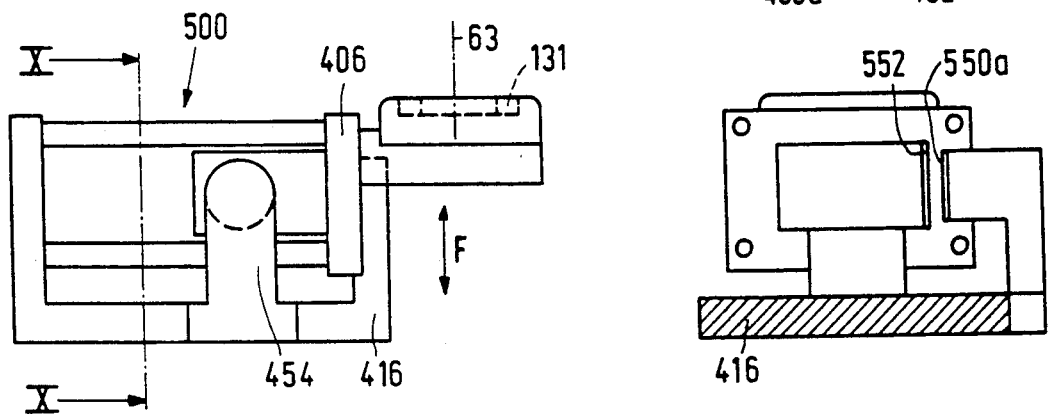
FIG.9
FIG.10
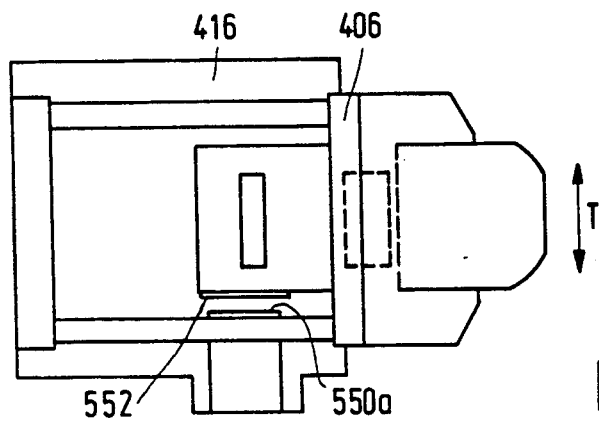
FIG.11

POSITIONING SYSTEM FOR THE HEADS OF A MAGNETO-OPTICAL DATA RECORDER

BACKGROUND OF THE INVENTION

The invention relates to a device for inscribing and/or reading a magneto-optical information carrier, the device comprising a frame with a turntable which is rotatable about an axis of rotation for supporting the information carrier; an optical unit arranged to be movable transversely of the axis of rotation and comprising a focusing optics for concentrating a radiation beam to form at least one radiation spot in a focusing plane, and an actuator for moving the focusing optics at least in a direction parallel to the axis of rotation; and a magnetic unit which, viewed in the direction of the axis of rotation, is arranged opposite to and is spaced from the optical unit, for generating a magnetic field which extends into the focusing plane. The magnetic unit is secured to a displacement body which is movable in a direction transverse to the axis of rotation.

Such a device is known from German Offenlegungsschrift DE 37 23 134. The prior-art device for magneto-optically inscribing a magneto-optical disc comprises a housing having a cover which can be opened and closed to insert or remove a magneto-optical disc. During operation the magneto-optical disc loaded into the housing is held on a turntable by a disc-pressure member and is rotated by a drive motor. The drive motor is secured to a frame accommodated in the housing. The housing further accommodates a slide which is movable over rectilinear guide means of the frame in a radial direction relative to the axis of rotation of the turntable. The slide is constructed as a tilted U-shaped part having two mutually parallel limbs which extend in radial directions relative to the turntable. One of the limbs carries an objective for concentrating a radiation beam to form a radiation spot and the other limb carries a permanent magnet for producing a magnetic bias field. The objective and the magnet are arranged opposite one another and are situated each at one side of the supporting surface of the turntable.

The information carrier to be used for magneto-optical recording is provided with a thin film of a ferromagnetic or a ferromagnetic material having a direction of easy magnetisation perpendicular to the surface of the thin film. During recording it is necessary that the thin film is heated to a temperature above the Curie temperature, or in the case of ferromagnetic materials to a temperature above the so-called compensation point. When the known device is used the magneto-optic disc is inscribed by applying a magnetic bias field by means of the permanent magnet and the thin film is heated by means of a pulsating laser beam.

SUMMARY OF THE INVENTION

It is an object of the invention to provide a device of the type defined in the opening paragraph, enabling a magneto-optical information carrier to be inscribed with the aid of pulsating magnetic field in such way that a comparatively large amount of information can be recorded per unit of time.

To this end the device in accordance with the invention is characterized in that, for moving the means for generating a magnetic field which extends into the focusing plane relative to the displacement body at least in a plane which is oriented transversely of the axis of rotation of the turntable, the magnetic unit comprises a further actuator secured to the displacement body, and a measurement and control system. During operation of the device this system determines the position of the generating means of the magnetic unit and the focusing means of the optical unit relative to one another, viewed along at least the direction of movement of the displacement body, and controls the position of the generating means of the magnetic unit relative to the focusing means.

During operation of the device a radiation beam produced by a radiation source of the device is focused by the optical unit, in particular the focusing means, for example an objective, to form a radiation spot in the focusing plane of the magneto-optical information carrier lying on the turntable for the purpose of following an information track in the information carrier. However, since a disc-shaped optical information carrier is never perfectly flat, the information track to be followed as the information carrier or disc rotates will not be situated exactly in one plane at a fixed distance from the objective. However, as the radiation spot formed by the focusing means should always be situated at the location of a track portion to be scanned the focusing means constantly performs focusing activity during operation.

The information track of the magneto-optical disc may be a spiral track extending around the axis of rotation of the disc, the track being inscribed and read, by convention, from the center towards the periphery. In order to achieve coarse radial tracking while the disc rotates, the optical unit is arranged on a slide or a pivotal arm to move the optical unit along a radial or substantially radial path relative to the axis of rotation. Since the track may be slightly eccentric relative to the disc and, in addition, the turntable of the device may exhibit slight radial deviations, allowance is to be made for small radial oscillations of the information track during rotation of the disc. The discrepancies then arising between the position of the radiation spot and the position of the track portion to be scanned are reduced by means of a radial tracking system, for which purpose the focusing means performs small generally high-frequency tracking movements relative to the slide or pivotal arm, which movements are directed radially viewed from the axis of rotation of the rotating optical disc. Said focusing and tracking movements can be realized by means of a 2D-actuator, known per se. for example as described in European Patent Application EP-A 0,310,156, to which U.S. Pat. No. 4,911,534 corresponds (herewith incorporated by reference).

During operation of the device in accordance with the invention the ferromagnetic or ferrimagnetic film of the information carrier is heated locally with the aid of a continuous-wave or a pulsed laser beam in order to record information. In addition, a pulsating magnetic field corresponding to the information to be recorded is produced in the information carrier at the location which is heated by the laser beam. Since the invention in particular aims at providing a high bit rate, for example 2000 kbyte/s., the generated magnetic field should pulsate at a high frequency. The presence of the further actuator and the measurement and control system makes it possible to ensure that the generating means, even in the case of a rapidly rotating information carrier, for example at 3000 r.p.m., are not only kept accurately at a predetermined distance from the information-carrier side facing the magnetic unit but also follow the information track of the information carrier very accurately. The means for generating the magnetic field then roughly follow the radial position of the focusing means and, consequently, the track to be scanned while the disc rotates by radially moving the magnetic unit by means of the displacement body, for example a slide or a pivotal arm, and the generating means accurately follow the tracking movements of the focusing means by an appropriate drive of the further actuator. In this way it is achieved that the pulsating magnetic field actively tracks the radiation spot formed by the focusing means. This has the advantage that the information can be recorded by means of a magnetic field directed into a comparatively small effective area in the focusing plane.

The further actuator can be an actuator known for such purposes. An actuator which is very suitable for moving said means relative to the magnetic unit is described in a Netherlands Patent Application (Application number 9001492) filed by the Applicant (to which U.S. application Ser. No. 07/662,044, corresponds herewith incorporated by reference).

The information recorded by means of the device in accordance with the invention can only be read optically, utilizing the Kerr effect.

An illustrative embodiment of the device in accordance with the invention, comprising a second displacement body, for example a slide or a pivotal arm, which carries the optical unit and which is movable in a direction oriented transversely of the axis of rotation of the turntable, is characterized in that the measurement and control system comprises a first detector unit for measuring the position of the focusing means of the optical unit relative to the displacement body carrying the optical unit, viewed in the direction of movement of said body, and a second detector unit for measuring the position of said means of the magnetic unit relative to the displacement body carrying the magnetic unit, viewed in the direction of movement of said body. In a surprisingly simple manner this embodiment provides an interlock between the radial positions of the focusing means and the means for generating a magnetic field which extends into the focusing plane, the further actuator being driven via the measurement and control system so as to make the radial position of said means most accurately correspond to the radial position of the focusing means.

A preferred illustrative embodiment is characterized in that the means for generating a magnetic field which extends into the focusing plane comprise a coil. Preferably, the coil forms part of a magnetic head secured to the magnetic unit. The use of a coil for generating the required magnetic field in the device in accordance with the invention has the special advantage of a comparatively low drive voltage and a low power dissipation because the inductance of the coil and/or the current through the coil can be small owing to said comparatively small effective area of the magnetic field.

It is to be noted that it is known for such purposes from European Patent Application EP 0,242,837 to use a coil secured to a support as a magnetic source in a magneto-optical apparatus.

A further illustrative embodiment of the device in accordance with the invention, in which the focusing means of the optical unit is secured to a first holder and the means of the magnetic unit are secured to a second holder, is characterized in that at least one of the detector units comprises an optical detector for cooperation with a reflecting surface of one of said holders, which detector comprises a light source and at least one photocell. An advantage of this embodiment is that the measurement process is without mechanical contact and that, in addition, no magnetic or electric fields are produced which could disturb the magneto-optical recording process. Another advantage is that the magnetic and electric fields produced by said means of the magnetic unit and the electrical conductors for these means cannot adversely affect the detector units.

Another illustrative embodiment, in which the focusing means of the optical unit is secured to a first holder and the means of the magnetic unit are secured to a second holder, is characterized in that at least one of the detector units comprises a capacitive detector for cooperation with a conductive layer of one of said holders, the detector comprising at least one electrode. An advantage of this embodiment is that said radial position of the focusing means and/or the means can be determined without mechanical contact and independently of a reflection coefficient.

The displacement body for the optical unit and the displacement body for the magnetic unit of the device in accordance with the invention may both form part of one slide which is movable in radial directions relative to the axis of rotation of the turntable over guide means, in particular rectilinear guide means, of the frame. For constructional reasons such a slide generally has a comparatively large mass, which may be incompatible with the requirement to have short access times.

A lightweight construction, which is very suitable to attain short access times, is obtained with an embodiment of the invention in which the frame is provided with a first guide means for the displacement body carrying the optical unit and constructed as a slide and a second or further guide means for the displacement body carrying the magnetic unit and constructed as a slide, which second guide means at least in operation of the device extends parallel to the first guide means, a system being provided for positioning the two displacement bodies relative to one another at least during operation.

A further embodiment of the device in accordance with the invention is characterized in that during operation the first detector unit supplies a measurement signal related to the radial position of the focusing means relative to the displacement body carrying the optical unit and the second detector unit supplies a measurement signal related to the radial position of the means for generating the magnetic field relative to the displacement body carrying the means, the measurement and control system comprising a differential amplifier for processing said signals, which amplifier is electrically connected to a controller for controlling electromagnetic drive means of the further actuator of the magnetic unit via a power amplifier.

BRIEF DESCRIPTION OF THE DRAWING

The invention will now be described in more detail, by way of example, with reference to the accompanying drawings in which:

FIG. 3 shows diagrammatically a first control system employed in the embodiment shown in FIG. 1, FIG. 4 shows diagrammatically a second control system employed in the embodiment shown in FIG. 1, FIG. 5 is a diagrammatic side view of a magnetic unit comprising an optical detector unit, employed in the embodiment shown in FIG. 1, FIG. 6 shows the magnetic unit in a sectional view taken on the line VI—VI in FIG. 5, FIG. 7 is a plan view of the magnetic unit shown in FIG. 5, FIG. 8 shows diagrammatically a first measurement and control system suitable for use in the device in accordance with the invention, FIG. 9 is a diagrammatic side view of the magnetic unit shown in FIG. 5 and comprising a capacitive detector unit, FIG. 10 shows the magnetic unit in a sectional view taken on the line X—X in FIG. 9, FIG. 11 is a plan view of a part of the magnetic unit shown in FIG. 9.

DETAILED DESCRIPTION OF THE PREFERRED EMBODIMENT

Figure 1:
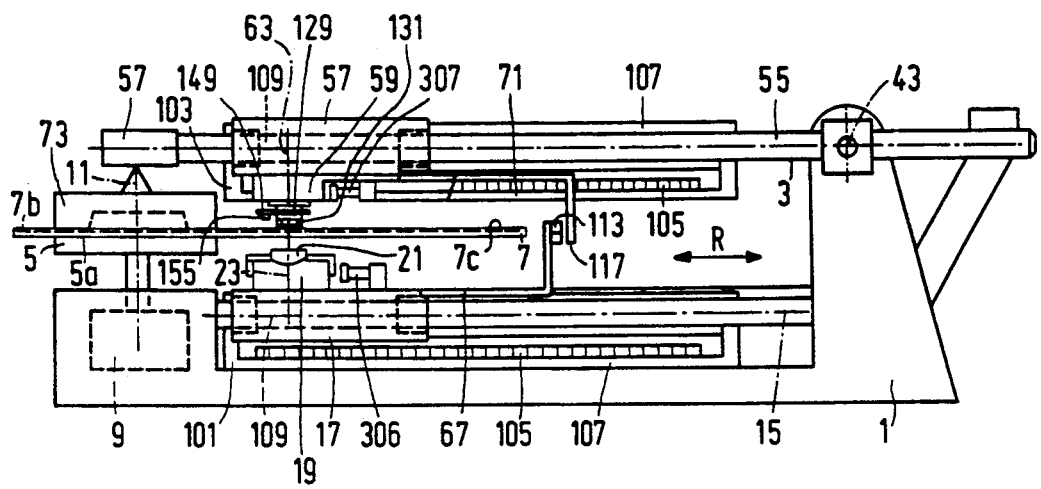
FIG. 1 is a diagrammatic side view of a first embodiment of the device in accordance with the invention.
Figure 2:
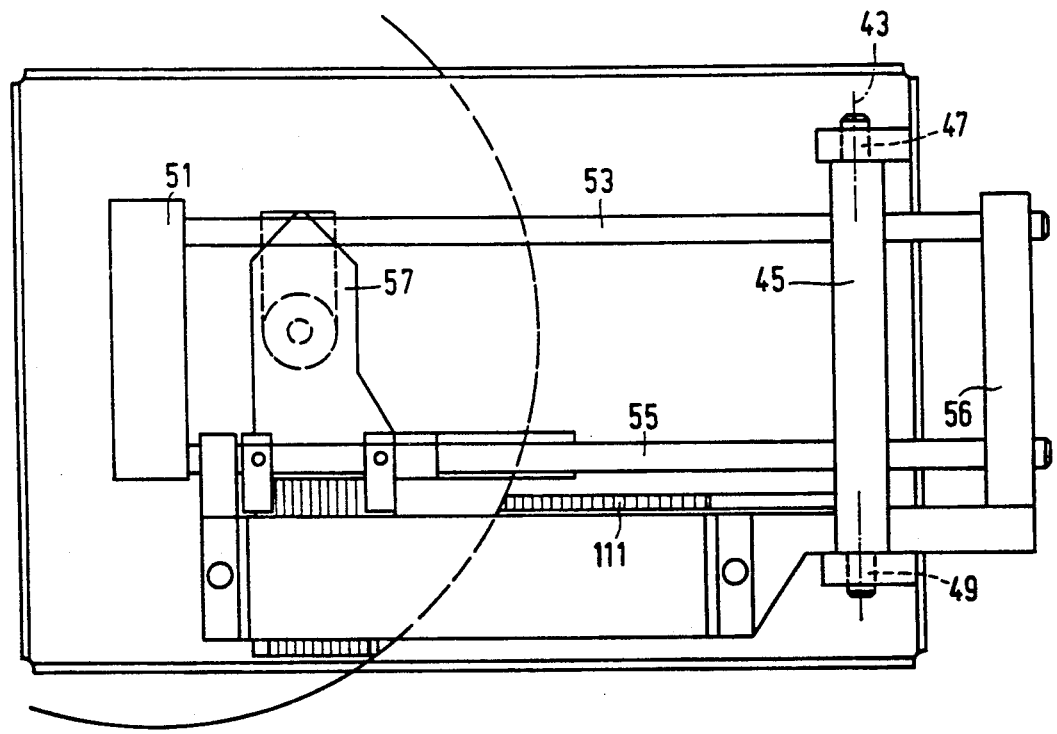
FIG. 2 is a plan view of a part of the embodiment shown in FIG. 1.

The illustrative embodiment of the device in accordance with the invention shown in FIGS. 1 and 2 comprises a frame 1 and a pivotable subframe 3. A turntable for supporting and centering a disc-shaped magneto-optical information carrier 7 is arranged in the frame 1. For this purpose the turntable 5 comprises a supporting surface 5a and a centering cone. An electric motor 9 secured in the frame 1 serves to rotate the turntable 5 about an axis of rotation 11, enabling a speed of for example 2400 revolutions per minute to be attained. Two guide spindles, of which only a guide spindle 15 is shown, are arranged on the frame 1 to form rectilinear guide means for a displacement body, in particular a slide 17. The guide spindles 15 extend parallel to one another and are oriented in such a way that the slide 17 can perform radial movements relative to the axis of rotation 11 in the indicated directions R between a position near the turntable and a position remoter from this turntable. The slide 17 carries an optical unit 19, comprising a focusing means, in particular an optical lens or objective 21 having an optical axis 23, and an electromagnetic actuator for moving the objective 21 relative to the slide 17. The electromagnetic actuator may be of a type known for such purposes. A suitable type is the 2D actuator disclosed in the said non-prepublished Netherlands Patent Application.

The subframe 3 is pivotable about a pivotal axis 43 defined by a shaft 45 having two journals 47 and 49 supported in the frame 1. The shaft 45 is secured to the subframe 3, which comprises two guide spindles 53 and 55 which extend parallel to one another and which are both secured to a connecting member 51 of the subframe 3. The guide spindles 53 and 55, which extend parallel to the guide spindles 13 and 15 of the frame 1 in the position shown, which corresponds to the operating position, provide the rectilinear guidance for a displacement body, in particular a slide 57, in radial directions R. The slide 57 carries a magnetic unit 59, which comprise an inductor coil 131 comprising means for directing a magnetic field which extends into the information plane 7b of the information carrier 7. The coil 131 is secured to a coil support or holder 129 with which it forms a magnetic head in the present example. The magnetic unit further comprises a further actuator, in particular an electromagnetic actuator, for moving said means, in particular said coil, relative to the slide 57. The magnetic unit 59, to which a magnetic axis 63 can be assigned, is situated opposite to and spaced from the optical unit 19. The information carrier 7 is situated between the optical unit 19 and the magnetic unit 59, and at least during operation it is important that the optical axis 23 and the magnetic axis 63 are aligned to an optimum extent.

At the location of the connecting member 51 the subframe carries a disc-pressure member 73 for pressing the information carrier 7 onto the turntable 5. To enable the information carrier 7 to be placed on or removed from the turntable the disc-pressure member can be moved away from the turntable by pivoting the subframe 3.

The slides 17 and 57 can be driven independently of one another in radial directions. For this purpose each slide is coupled to a linear motor, 101 and 103 respectively. Both motors 101 and 103 each comprise a stator having a magnet 105 and a stator yoke 107, and an armature having one or more coils 109. For the purpose of position detection one of the two motors, for example the linear motor 101, is provided with an incremental measurement ruler 111 and an optical sensor which cooperates therewith. In order to guarantee an optimum cooperation between the optical unit 19 and the magnetic unit 59 when the magneto-optical information carrier 7 is inscribed the device comprises a control system for radially positioning the optical unit and the magnetic unit relative to one another at least during operation. The control system comprises an optical distance meter (opto-coupler) 113 arranged on a slide member 67 of the slide 17 and a reflecting surface 117 provided on a slide member 71 of the slide 57. The optical distance meter 113 is arranged opposite the reflecting surface 117 and is included in an electronic control system.

The above-mentioned control system employed in the device shown in FIGS. 1 and 2 will be described in more detail with reference to FIG. 3. A signal a from a player control system is applied to a controller I to establish the correct initial conditions such as bringing the reflecting surface within the measurement range of the opto-coupler 113 after the device has been switched on. Moreover, a signal b corresponding to the desired slide position (set-point) is applied to the controller I. The optical distance meter 113 supplies a signal c to the controller I, the value of this signal being dependent on the distance from the reflecting surface 117. In the controller I the signal c is compared with the signal b, the controller ensuring that the control system has the desired stability and that the slides 17 and 57 are accurately in track with one another. The controller I supplies an output voltage Vu1 to an output amplifier II, which drives the coil 109 of the linear motor 107 of the slide 57.

The device shown in FIGS. 1 and 2 further comprises a control system for determining, when the device is in operation, the distance between a reference surface, for example the side of the coil 131 which faces the objective, and the surface 7c of the information carrier 7 which faces the magnetic unit and for adjusting the desired distance between the coil and the information carrier. This control system comprises an optical sensor unit 155, secured to a supporting element 149 adjacent the coil 131. The sensor unit 155 comprises, for example, an emitter for emitting an optical beam and two receivers for receiving the radiation reflected from the side 7c of the information carrier 7.

The last-mentioned control system will be described in greater detail with reference to the block diagram shown in FIG. 4. The emitter mentioned in the preceding paragraph bears the reference numeral 161 and the two receivers bear the reference numerals 163 and 165. The receiver 163 is a reference diode and the receiver 165 is a measurement diode. The magneto-optical information carrier bears the reference numeral 7. A reference current d from the reference diode 163 and a measurement current e from the measurement diode 165 are applied to a unit III. The unit III supplies a normalised signal f, which is applied to a controller IV. A signal g which is related to the desired position of the coil 131 relative to the information carrier, is applied to the controller IV by a player control system. The controller IV provides the desired stability of the control system and controls the desired distance from the optical disc 7, the signals f and g being compared with one another in the controller IV. The controller IV supplies an output voltage Vu4 to an output amplifier V. The output amplifier V drives the actuator of the magnetic unit 59 to move the coil 131 relative to the slide 57 along the magnetic axis 63.

It is to be noted that the above control systems are described comprehensively in the non-prepublished European Patent Application bearing the application number 9020067606 to which U.S. application Ser. No. 452986 corresponds.

The device in accordance with the invention shown in FIGS. 1 and 2 comprises a measurement and control system for determining the radial position of the objective 21 of the optical unit 19 relative to the slide 17 and the radial position of the coil 131 of the magnetic unit 59 relative to the slide 57 and for controlling the desired radial position of the coil 131 relative to the objective 21. For this purpose the measurement and control system comprises a first detector unit 306 arranged on the slide 17 and a second detector unit 307 arranged on the slide 57. The first detector unit 306 serves for determining the radial position of the objective relative to a reference surface of the slide 17 or the actuator secured to this slide 17, and the second detector unit 307 serves for determining the radial position of the coil 131 relative to a reference surface of the slide 57 or the actuator secured to this slide 57.

FIGS. 5, 6 and 7 show an example of a suitable actuator 400 enabling the means for generating a magnetic field in the device in accordance with the invention to be moved in two directions. The actuator 400 comprises a holder 404 corresponding to the holder 129 in FIG. 1 and carrying a magnetic head 431 comprising an induction coil. The holder 404 forms part of a movable section 406 of the actuator 400, a focusing coil 412 and two tracking coils 414a and 414b being secured to said movable section. The actuator further comprises a stationary section 416, comprising a permanent magnet 418, magnetized as indicated by the arrow M, and ferromagnetic parts. Together with the ferromagnetic parts of the stationary section 416 the magnet 418 constitutes a magnetic circuit, a magnetic gap 420 being formed between the magnet 418 and one of the ferromagnetic parts 416a.

The movable section 406 is movably suspended from the stationary section 416 by means of four elongate limbs or pivotally attached rods 426a, 426b, 428a and 428b the focusing coil 412 and the tracking coils 114a and 114b extending partly into the air gap to cooperate with the magnet 418. The stationary section 416 has a base plate 416b for securing it to the slide 57 of the device shown in FIG. 1.

In the case of a suitable drive of the coils 412 and 414a, 414b the magnetic head 431 can perform focusing movements and tracking movements in the directions indicated by the arrows F and T respectively, the directions indicated by the arrow F corresponding to the direction of the axis of rotation 11 of the turntable 5 in the device shown in FIG. 1 and the directions indicated by the arrow T corresponding to the radial directions R indicated in FIG. 1.

The actuator 400 comprises a detector unit 450 having at least one optical detector 450a comprising an emitter for emitting and optical beam and a receiver for receiving the beam reflected from a reflective surface 452. The reflective surface 452 is situated at a side 406a of the movable section 406 of the actuator 400. The detector unit 450 is mounted on a support 454 secured to the stationary section of the actuator 400.

In a similar way the optical unit 19 of the device shown in FIG. 1 may comprise an optical detector unit, a reflecting surface being provided on the movable section of the 2D actuator which carries the objective 21 and which may similar to that employed in the magnetic unit, and the optical detector being arranged on the stationary section of the actuator.

The measurement and control system used in the device in accordance with the invention and comprising the detector unit shown in FIGS. 5, 6 and 7 will now be described in more detail with reference to the block diagram shown in FIG. 8. The detector unit of the optical unit 19 (see also FIG. 1) mentioned in the preceding paragraph bears the reference numeral 460. The detector units 450 and 460 each have an optical detector 450a and 460a respectively, comprising an emitter 455a and 465a respectively and a phototransistor 455b and 465b respectively. The reflective surface on the movable section of the further actuator of the magnetic unit bears the reference numeral 452 and the reflective surface on the movable section of the actuator of the optical unit bears the reference numeral 462. During operation the detector unit 450 supplies a measurement signal h, which is related to the actual radial position of the coil 131 of the magnetic unit 59 relative to the stationary section 416 of the actuator 400, and the detector unit 460 supplies a measurement signal i, which is related to the actual radial position of the objective 21 relative to the stationary section of the actuator for the objective lens, to a differential amplifier VI. The differential amplifier VI feeds a signal j to a controller VII, which ensures the desired stability of the system and the accuracy of the setting of the radial position of the coil 131 and the objective 21 relative to one another. A signal x may be applied to the differential amplifier VI or the controller VII to compensate for mechanical and/or electrical tolerances. The controller VII has an output voltaqe Vu7 and is electrically connected to a power amplifier VIII. The amplifier VIII drives the tracking coils 414a and 414b of the actuator 400.

With respect to its construction and the electromagnetic drive the actuator 500 shown in FIGS. 9, 10 and 11 and intended for use in the device in accordance with the invention is identical to the actuator 400 shown in FIGS. 5, 6 and 7. The difference with the actuator 400 is that the actuator 500 comprises a detector unit of another type, i.e. a unit having a capacitive detector 550a. The detector 550a comprises an electrically conductive surface, for example of phosphor-bronze, and cooperates with a conductive layer 552 on the movable section of the actuator. As the construction and mechanical operation of the actuator 500 are similar to that of the actuator 400 reference is made to the paragraphs relating to FIGS. 5, 6 and 7 for a more detailed description. When a capacitive detector is used in the actuator of the magnetic unit the actuator of the optical unit preferably also employs a detector unit of the capacitive type.

Figure 12:
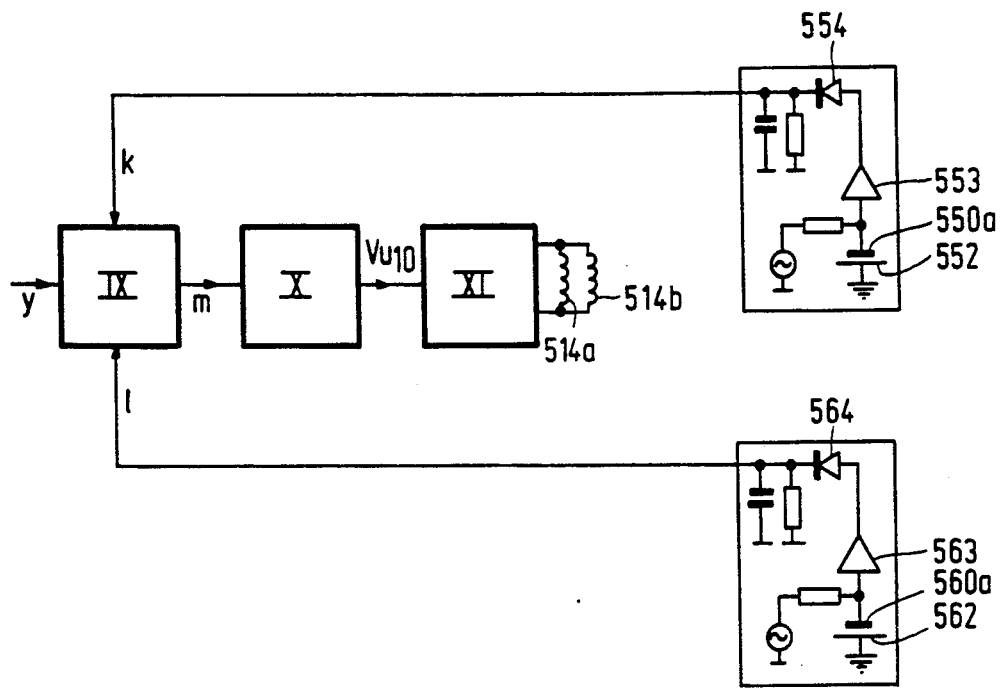
FIG. 12 shows diagrammatically a second measurement and control system suitable for use in the device in accordance with the invention.

FIG. 12 shows a block diagram to explain the measurement and control system comprising capacitive detectors in the magnetic and the optical unit of the device in accordance with the invention. The capacitive detector in the magnetic unit 59 bears the reference numeral 550a and the capacitive detector in the optical unit 19 bears the reference numeral 560a (see also FIG. 1). The conductive layers situated opposite the detectors 550a and 560a bear the reference numerals 552 and 562 respectively. During operation the detector 550a supplies a measurement signal which is related to the actual radial position of the coil 131 relative to the slide 57, which signal is applied to a buffer amplifier 553 and is subsequently rectified by a rectifier 554. The detector 560a supplies a measurement signal which is related to the actual radial position relative to the, slide 17, which signal is applied to a rectifier 564 via a buffer amplifier 563. The rectified signals k and l are applied to a differential amplifier IX, which feeds an output signal m to a controller X, which maintains the stability of the system and the accuracy of the setting of the radial position of the coil 131 relative to the objective 21. A compensation signal Y may be applied to the amplifier IX to compensate for possible mechanical and/or electrical tolerances. The controller X supplies an output voltage Vu10 to a power amplifier XI, which drives the tracking coils 514a and 514b of the actuator 500.

Figure 13:
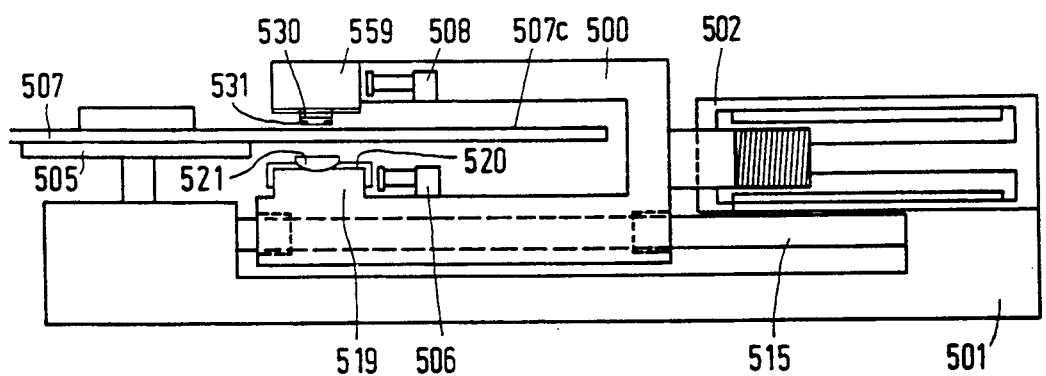
FIG. 13 is a diagrammatic side view of a second embodiment of the device in accordance with the invention.

The embodiment of the device shown in FIG. 13 comprises a U-shaped slide 500, which carries an optical unit 519 and a magnetic unit 559. The slide comprises a rectilinear guide means, of which the Figure shows a guide spindle 515, which is supported in the frame 501. The construction of the optical unit 519 and the magnetic unit 559 corresponds to that of the units 19 and 59 respectively, shown in FIGS. 1 and 2. In the present embodiment the optical unit comprises a first holder 220 with an objective 521, which unit can be driven by a 2D actuator, and the magnetic unit comprises a second holder 530 with a coil 531, which unit can also be driven by a 2D actuator. An electric motor 502, for example a linear stepping motor, secured to the frame 501 can drive the slide 500 in a radial direction relative to a turntable 505 supported in the frame 501. A slide carrying both the optical unit and the magnetic unit has the advantage that both units can be moved synchronously without any additional provisions, so that in operation the radial position of the two units relative to one another does not change. Therefore, this embodiment does not require a control system for radially positioning the magnetic unit 559 and the optical unit 519 relative to one another.

The device shown in FIG. 13 comprises a control system for determining during operation the distance between a reference surface, for example the side of the coil holder 530 which faces the objective 521, and the side 507c, facing the magnetic unit 559, of a magneto-optical disc or information carrier 507 lying on the turntable 505, and for establishing a well-defined distance between the coil and the information carrier. The control system may be of a type as specified in the foregoing.

The device shown in FIG. 13 further comprises a measurement and control system for determining the radial position of the coil 531 and the objective 521 relative to each other and for controlling the desired radial position of the coil 531 relative to the track to be scanned. The measurement and control system, which comprises two detector units 506 and 516 arranged on the slide 500 to cooperate with parts, for example the holders 520 and 530, which are secured to the objective 521 and the coil 531 respectively, may correspond to the measurement and control systems described hereinbefore.

It is to be noted that the invention is not limited to the embodiments shown and described herein. It is obvious that further embodiments are possible within the scope of the present invention.

We claim:

1. A device for inscribing and/or reading a magneto-optical information carrier, comprising:
   a frame, and a turntable mounted to the frame for rotation about an axis of rotation for supporting the carrier,
   a first unit arranged to be movable transversely to said axis, comprising focusing means for concentrating a radiation beam to form at least one radiation spot in a focusing plane, and a first actuator for moving the focusing means at least in a direction parallel to said axis,
   a displacement body, and means for moving said displacement body with respect to said turntable in a direction transverse to said axis, to a position generally opposite to said first unit, and
   a second unit mounted to said displacement body for movement therewith, and arranged, in a direction parallel to said axis, opposite to and spaced from said first unit, comprising first means, for directing a magnetic field which extends into said focusing plane,
   characterized in that the device further comprises second means, for moving said first means with respect to said displacement body, at least in a plane oriented transversely to said axis,
   said second means comprises a second actuator secured to said displacement body, and a measurement and control system, and
   the measurement and control system comprises means for determining, during operation of the device, the position of said first means relative to said focusing means at least in the direction of movement of the displacement body; and third means, controlling at least said second actuator, for controlling the position of said first means relative to said focusing means.

2. A device as claimed in claim 1, characterized in that said first means comprises a coil.

3. A device as claimed in claim 2, characterized in that the first unit is movably mounted to said displacement body, for movement with respect to said body in said direction parallel to said axis, and said device further comprises a third actuator for moving said first unit with respect to said displacement body.

4. A device as claimed in claim 3, comprising a first detector unit and a second detector unit, during operation said first detector unit supplying a measurement signal related to radial position of said focusing means relative to said displacement body and said second detector unit supplying a measurement signal related to the radial position of the first means relative to the displacement body, and said measurement and control system comprises a differential amplifier for processing said signals, said amplifier being electrically connected to a controller for controlling electromagnetic drive means for said second actuator.

5. A device for inscribing and/or reading a magneto-optical information carrier, comprising:

a frame, and a turntable mounted to the frame for rotation about an axis of rotation for supporting the carrier, first and second displacement bodies, and respective means for moving said displacement bodies with respect to said turntable in a direction transverse to said axis, a first unit mounted to said second displacement body, comprising focusing means for concentrating a radiation beam to form at least one radiation spot in a focusing plane, and a first actuator for moving the focusing means at least in a direction parallel to said axis, and a second unit mounted to said first displacement body for movement therewith, and arranged, in a direction parallel to said axis, opposite to and spaced from said first unit, comprising first means, for directing a magnetic field which extends into said focusing plane, characterized in that the device further comprises second means, for moving said first means with respect to said first displacement body, at least in a plane oriented transversely to said axis, said second means comprises a second actuator secured to said first displacement body, and a measurement and control system, and the measurement and control system comprises first and second detectors, and means, controlling at least said second actuator, for controlling the position of said first means relative to said focusing means, said first detector being arranged for measuring the position of said focusing means relative to said second displacement body in said direction transverse to said axis and said second detector unit measuring the position of said first means relative to the first displacement body in said direction transverse to said axis.

6. A device as claimed in claim 5, characterized in that said first means comprises a coil.

7. A device as claimed in claim 6, characterized in that during operation the second detector unit supplies a measurement signal related to the radial position of the focusing means relative to the second displacement body, and the first detector unit supplies a measurement signal related to the radial position of the first means relative to the first displacement body, and the measurement and control system comprises a differential amplifier for processing said signals, said amplifier being electrically connected to a controller for controlling electromagnetic drive means of the second actuator.

8. A device as claimed in claim 5, characterized in that during operation the second detector unit supplies a measurement signal related to the radial position of the focusing means relative to the second displacement body, and the first detector unit supplies a measurement signal related to the radial position of the first means relative to the first displacement body, and the measurement and control system comprises a differential amplifier for processing said signals, said amplifier being electrically connected to a controller for controlling electromagnetic drive means of the second actuator.

9. A device as claimed in claim 8, comprising a first holder to which said focusing means is secured, and a second holder to which said first means is secured, characterized in that at least one of said detector units comprises an optical detector for cooperating with a reflecting surface of one of said holders, said at least one of said detector units comprising a light source and at least one photocell.

10. A device as claimed in claim 8, comprising a first holder to which the focusing means is secured, and a second holder to which the means for generating is secured, characterized in that at least one of said detector units comprises a capacitive detector for cooperating with a conductive layer of one of said holders, said at least one of the detector units comprising at least one photocell.

11. A device as claimed in claim 10, characterized in that during operation the second detector unit supplies a measurement signal related to the radial position of the focusing means relative to the second displacement body, and the first detector unit supplies a measurement signal related to the radial position of the first means relative to the first displacement body, and the measurement and control system comprises a differential amplifier for processing said signals, said amplifier being electrically connected to a controller for controlling electromagnetic drive means of the second actuator.

12. A device as claimed in claim 8, comprising guide means for the second displacement body, constructed as a slide; and further guide means for the first displacement body, constructed as a slide, at least during operation of the device said further guide means extending parallel to the guide means for the second displacement body, and means for positioning said first and second displacement bodies relative to one another.

13. A device as claimed in claim 12, characterized in that during operation the second detector unit supplies a measurement signal related to the radial position of the focusing means relative to the second displacement body, and the first detector unit supplies a measurement signal related to the radial position of the first means relative to the first displacement body, and the measurement and control system comprises a differential amplifier for processing said signals, said amplifier being electrically connected to a controller for controlling electromagnetic drive means of the second actuator.

14. A device as claimed in claim 13, characterized in that during operation the second detector unit supplies a measurement signal related to the radial position of the focusing means relative to the second displacement body, and the first detector unit supplies a measurement signal related to the radial position of the first means relative to the first displacement body, and the measurement and control system comprises a differential amplifier for processing said signals, said amplifier being electrically connected to a controller for controlling electromagnetic drive means of the second actuator.

15. A device as claimed in claim 5, comprising a first holder to which said focusing means is secured, and a second holder to which said first means is secured, characterized in that at least one of said detector units comprises an optical detector for cooperating with a reflecting surface of one of said holders, said at least one of said detector units comprising a light source and at least one photocell.

16. A device as claimed in claim 15, characterized in that during operation the second detector unit supplies a measurement signal related to the radial position of the focusing means relative to the second displacement body, and the first detector unit supplies a measurement signal related to the radial position of the first means relative to the first displacement body, and the measurement and control system comprises a differential amplifier for processing said signals, said amplifier being electrically connected to a controller for controlling electromagnetic drive means of the second actuator.

17. A device as claimed in claim 5, comprising a first holder to which said focusing means is secured, and a second holder to which said first means is secured, characterized in that at least one of the detector units comprises a capacitive detector for cooperation with a conductive layer of one of said holders, said at least one of the detector units comprising at least one electrode.

18. A device as claimed in claim 17, characterized in that during operation the second detector unit supplies a measurement signal related to the radial position of the focusing means relative to the second displacement body, and the first detector unit supplies a measurement signal related to the radial position of the first means relative to the first displacement body, and the measurement and control system comprises a differential amplifier for processing said signals, said amplifier being electrically connected to a controller for controlling electromagnetic drive means of the second actuator.

19. A device as claimed in claim 5, comprising guide means for the second displacement body, constructed as a slide; and further guide means for the first displacement body, constructed as a slide, at least during operation of the device said further guide means extending parallel to the guide means for the second displacement body, and means for positioning said first and second displacement bodies relative to one another.

* * * * *